United States Patent [19]

Archambault et al.

[11] Patent Number: 5,374,102
[45] Date of Patent: Dec. 20, 1994

[54] CHAIR ASSEMBLY FOR VEHICLE

[75] Inventors: Bruno Archambault; André Albert, both of Sherbrooke; Francois Lavoie, Bromptonville; Mario Maltais, Stoke, all of Canada

[73] Assignee: Baultar Inc., Richmond, Canada

[21] Appl. No.: 39,822

[22] Filed: Mar. 30, 1993

[51] Int. Cl.⁵ .............................................. B60N 2/02
[52] U.S. Cl. ......................... 297/344.13; 297/344.19; 297/344.24; 297/423.26; 297/411.36; 297/411.38; 297/300
[58] Field of Search ............ 297/344.1, 344.12, 344.13, 297/344.16, 344.18, 344.19, 344.21, 344.22, 344.24, 337–339, 411.32, 411.35, 411.36, 411.38, 423.19, 423.25, 423.26, 423.29, 423.3, 423.44, 423.46, 291, 296–298, 300, 354.12; 248/161, 415, 416, 425, 157

[56] References Cited

U.S. PATENT DOCUMENTS

| | | | |
|---|---|---|---|
| 2,412,750 | 12/1946 | Raitch | 248/416 |
| 2,676,643 | 4/1954 | Miller et al. | 297/DIG. 4 X |
| 3,542,326 | 11/1970 | Reapsummer | 248/416 X |
| 3,547,394 | 12/1970 | Wehner | 297/344.19 X |
| 4,030,749 | 6/1977 | Strahm | 297/344.18 |
| 4,113,220 | 9/1978 | Godwin et al. | 297/344.19 X |
| 5,039,167 | 8/1991 | Sweet | 297/423.28 X |
| 5,098,160 | 3/1992 | Moore et al. | 297/423.27 X |
| 5,143,422 | 9/1992 | Althofer et al. | 297/411.36 |
| 5,171,063 | 12/1992 | Stidd | 297/344.1 |
| 5,285,992 | 2/1994 | Brown | 297/423.45 X |

FOREIGN PATENT DOCUMENTS

| | | | |
|---|---|---|---|
| 2049282 | 4/1972 | Germany | 297/423.26 |
| 3024920 | 1/1982 | Germany | 297/423.1 |
| 3101329 | 9/1982 | Germany | 297/423.28 |
| 0784863 | 12/1980 | U.S.S.R. | 297/423.45 |
| 007243 | 12/1986 | WIPO | 297/423.19 |

Primary Examiner—Kenneth J. Dorner
Assistant Examiner—Milton Nelson, Jr.
Attorney, Agent, or Firm—ROBIC

[57] ABSTRACT

A chair assembly for use in a vehicle such as a locomotive, having a height adjustable base which is free of any wobble and shaking motion, whether being raised, lowered or in use by a driver. The chair also has lateral movement capacity as well as fore-aft or side-aft movement relative to the base. A footrest adjustable by the feet of the driver is further provided.

23 Claims, 6 Drawing Sheets

CHAIR ASSEMBLY FOR VEHICLE

BACKGROUND OF THE INVENTION a) Field of the Invention

The present invention relates to a chair assembly designed to be of maximum comfort and sturdiness in a vehicle such as a locomotive, which shakes and vibrates when in motion.

b) Brief Description of the Prior Art

Heavy vehicles, particularly locomotives of the type in use today have limited space in the cabin. Thus it is not easy for the driver or other personnel to get into or leave the driver's seat. In addition, it is sometimes necessary for the locomotive driver to look out the side window for some railroad work such as yard stitching.

Accordingly, it is known to provide a seat which is slidably mounted on a rail so that the seat can slide forwardly or rearwardly in the cabin. For example, U.S. Pat. No. 5,118,062 issued on Jun. 2, 1992 to one of the instant inventors, Mr. Archambault, teaches the use of a seat attached to the side wall of a locomotive driver's cabin in a cantilever manner. The seat that can be easily adjusted horizontally along a rail attached to the side wall of the cabin, is pivotally mounted on a vertical axis by means of a threaded shaft extending into a threaded sleeve which allows the seat to be raised or lowered by turning the same.

It has been found that such a mounting of the seat with a threaded shaft extending into a threaded sleeve is unsatisfactory. Over a period of time, the threaded shaft and threaded sleeve tend to wobble and become loose due to the movement of the locomotive described above. This becomes a major source of discomfort and back pain especially when the train is on a long trip.

Moreover, for the yard switching mentioned above, the seat disclosed in the above patent cannot be moved laterally. As a matter of fact, it is mounted at a fixed distance from the side wall of the locomotive. This results in an undesirable stretching and twisting of the back when the driver wants to look out of the side window.

OBJECT AND SUMMARY OF THE INVENTION

An object of the present invention is to provide a chair assembly for use in the driver's cabin of a locomotive although the invention is not exclusively restricted to that application, which obviates at least some of the above-mentioned disadvantages.

Another object of the invention is to provide a chair assembly of the above mentioned type, which is comfortable for drivers of varying physical proportions.

The chair assembly according to the invention as it is broadly claimed hereinafter, basically comprises:
a chair having a seat and a backrest; and
a chair supporting height-adjustable base including mounting means to provide rotation, smooth raising and smooth lowering of said chair whenever desired, and effective immobility of said chair in any given position, whereby said chair is wobble and vibration free at all times.

According to a first important feature of the invention, the mounting means comprises:
a support bracket adapted to be secured to the vehicle;
an uppermost plate on which the chair is mounted;
a first cylindrical member secured to the center of said plate and extending downwardly therefrom;
a power cylinder sized to fit precisely into said first cylindrical member, said cylinder having a lower end bearing onto a horizontal portion of the support bracket, and an upper end bearing onto said uppermost plate;
means to operate said power cylinder from the chair to raise and lower said chair;
a second cylindrical member into which said first cylindrical member precisely fits in a rotatable manner;
means to retain the second cylindrical member from slipping downwardly relative to the first cylindrical member;
a third cylindrical member attached to an upper portion of said bracket and in which said second cylindrical member is held in a sliding yet non rotatable manner;
means to releasably lock the uppermost plate to said second cylindrical member to prevent rotation of the chair relative to the base whenever desired.

Preferably, the third cylindrical member can be provided with guide means for facilitating raising and lowering of the chair. The guide means may comprise:
three equally circumferentially spaced tangential slots formed in the third cylindrical member close to each end thereof;
roller bearings mounted in each slot and contacting a corresponding flattened outer surface portion of the second cylindrical member, such a contact preventing the second cylindrical member from rotating relative to said third cylindrical member; and
means to adjustably secure said roller bearings in said slots.

According to a second important feature of the invention that can be used as such or combined with the first one whenever desired, the chair assembly of the basic structure disclosed hereinabove may also comprise:
a slide plate that is part of said mounting means, the slide plate having rollers mounted thereon for lateral rotation;
a chair carriage to which is attached the chair, the carriage being slidably mounted onto the slide plate and comprising a pair of laterally extending channels in which the rollers of the carriage are adapted to roll; and
lock means to releasably lock the carriage relative to the slide plate in any desired position, the lock means comprising:
an elongated bar disposed in one of the channels between the adjacent rollers and the adjacent side wall of the carriage, the elongated bar having a central threaded hole; and
a long shaft journaled in the carriage in a transversal direction, the shaft having a threaded portion at one end thereof that engages the threaded hole, whereby rotating the shaft in one direction locks the elongated bar against the rollers to lock the carriage to the slide plate.

Preferably, the backrest of the chair is supported by a frame pivotally connected to the seat about a transversal pivot axis. In this particular case:
one side of the frame has a lower end projecting downwardly from the pivot axis;

a tension spring is secured to the lower end and to a front portion of the seat; and means are provided to adjustably incline the backrest, biased by said tension spring.

According to still another important feature of the invention, that can be used as such or combined with any one of the above mentioned features the chair assembly may further comprise a footrest which is vertically adjustable by way of an adjustment means, the adjustment means comprises:

a foot support, a pair of arms having lower ends pivotally attached to the support bracket and upper ends attached to the foot support; and a second power cylinder having one end pivotally secured to the bracket and another end secured to the foot support, this cylinder being actuable by a button located in the foot support and connected to a switch means;

whereby one can raise or lower the footrest by depressing the button with a foot and by pushing against the foot support, respectively.

BRIEF DESCRIPTION OF THE DRAWINGS

The invention and its numerous advantages will be better understood upon reading the following, non-restrictive description of a preferred embodiment thereof, given with reference to the accompanying drawings, in which.

DESCRIPTION OF A PREFERRED EMBODIMENT

Figure 1:
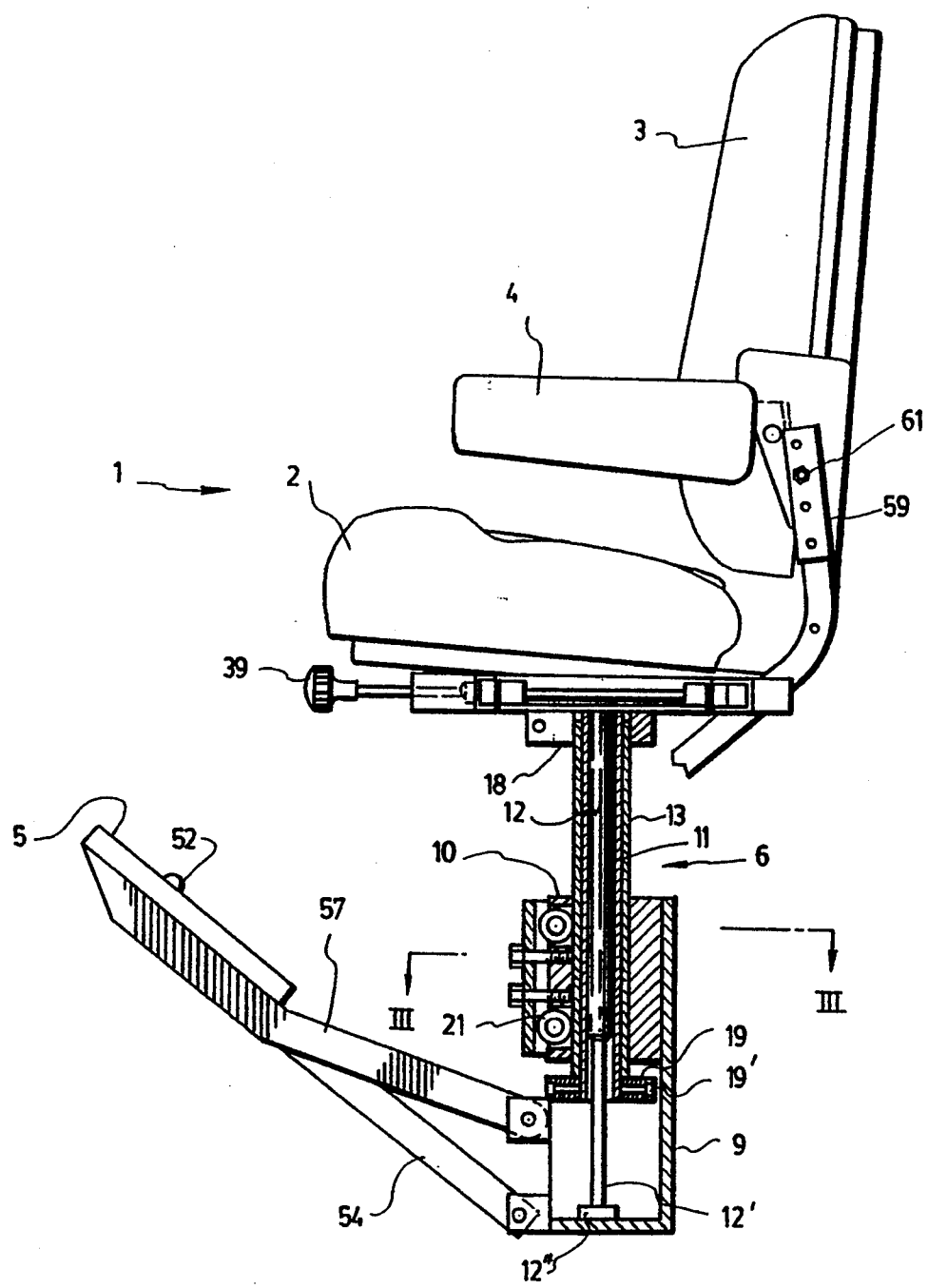
FIG. 1 is a side elevation of a chair assembly according to the invention, especially designed for use in a locomotive driver's cabin, showing its base in cross-section and in an elevated position.
Figure 6:
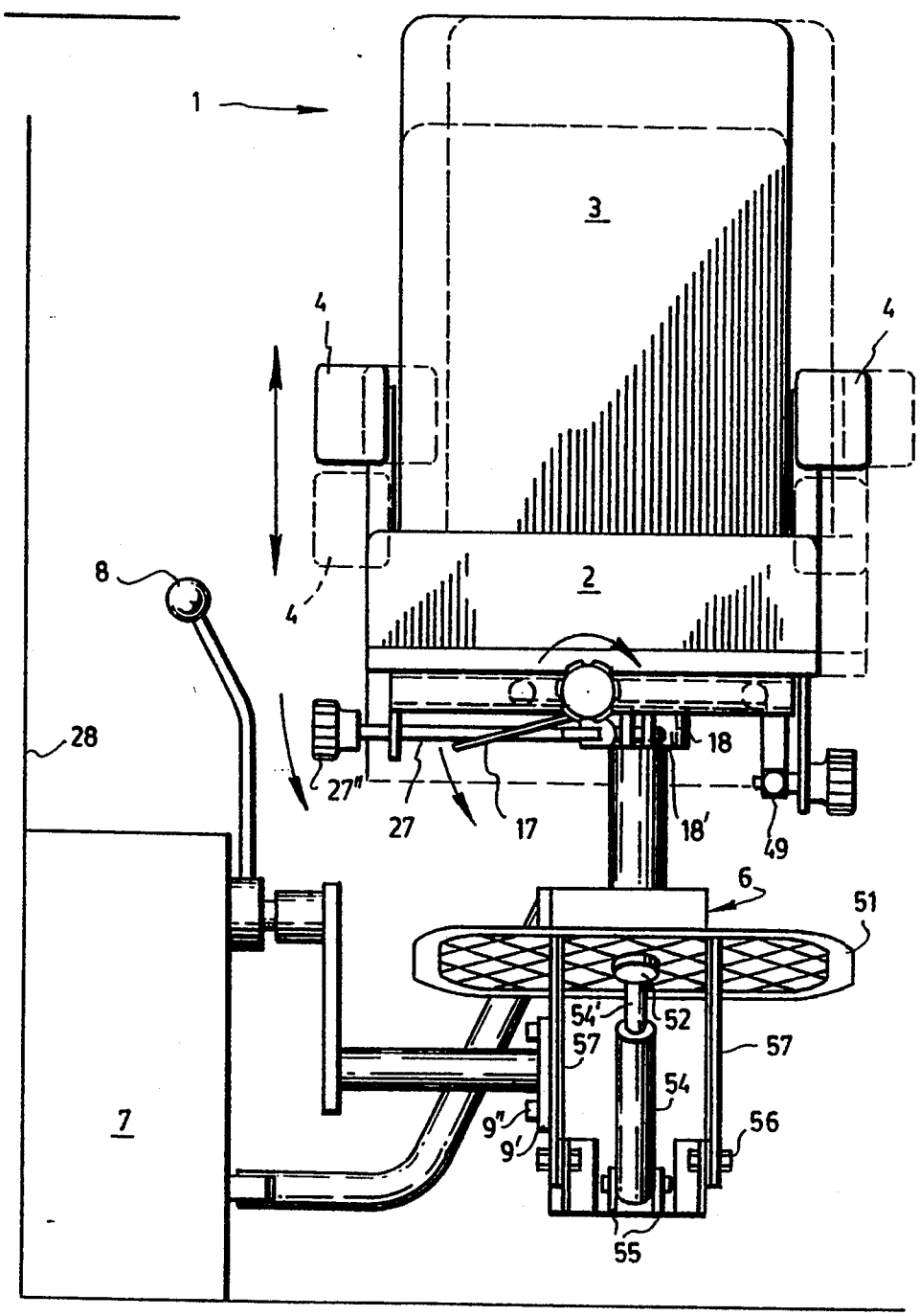
FIG. 6 schematic front elevation view of the chair assembly attached to the horizontal rail of a side wall.
Figure 7:
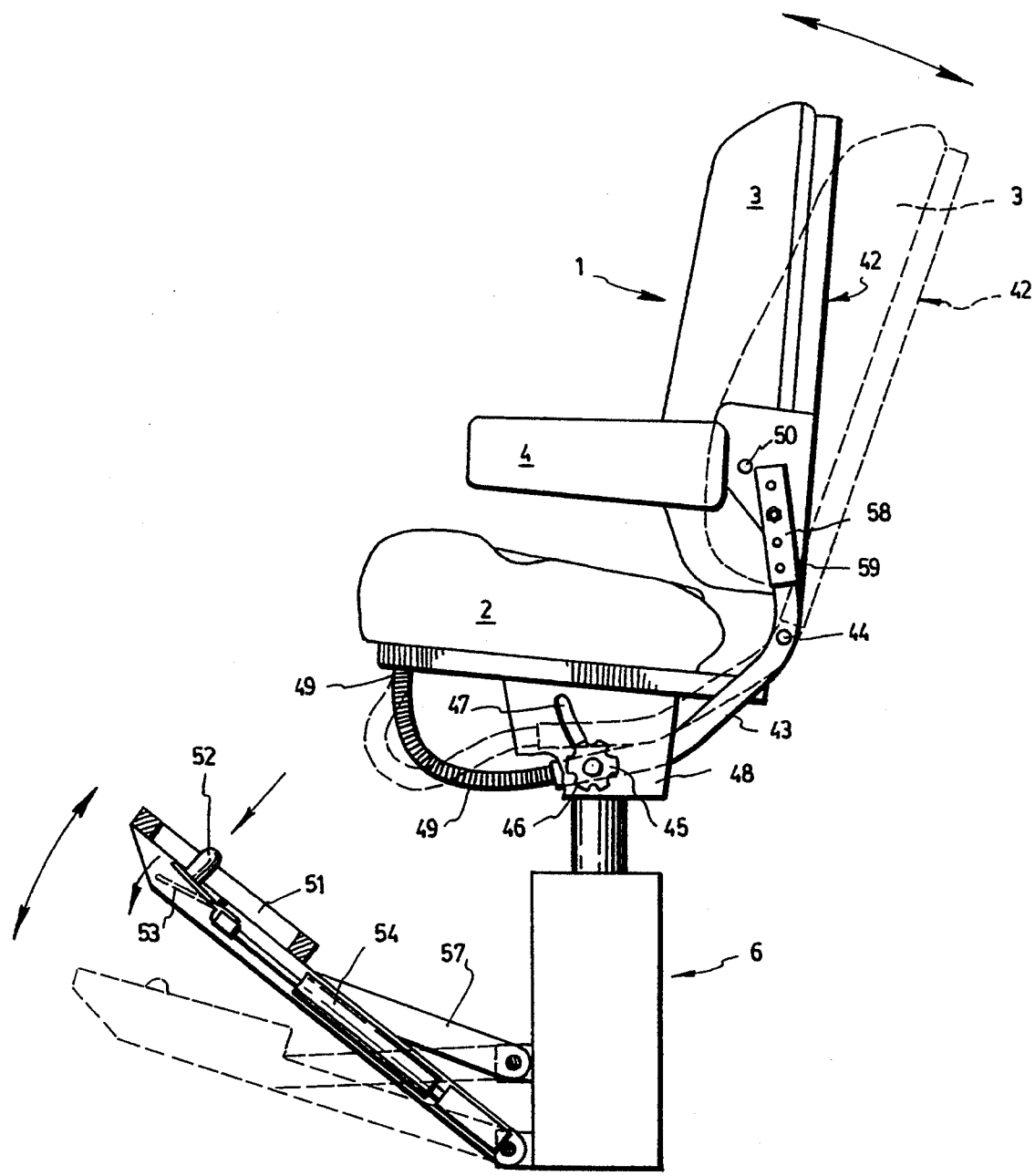
FIG. 7 is a view similar to that of FIG. 1, showing the movement of the backrest and footrest.

The chair assembly 1 according to the invention as shown in FIGS. 1 and 7 of the drawings, basically comprises a seat 2, a backrest 3, a pair of armrests 4 and a footrest 5, all of which are mounted on a height adjustable base 6. The chair assembly 1 may be fixed to the floor of a locomotive driver's cabin or, preferably, it may be attached—as shown in FIG. 6—to a seat attachment assembly 7 as disclosed to the above-mentioned U.S. Pat. No. 5,118,062, for fore-aft motion along a rail attached to a side wall of the cabin, such a motion being controlled by a lever 8 easily actuable from the chair assembly.

Figure 2:
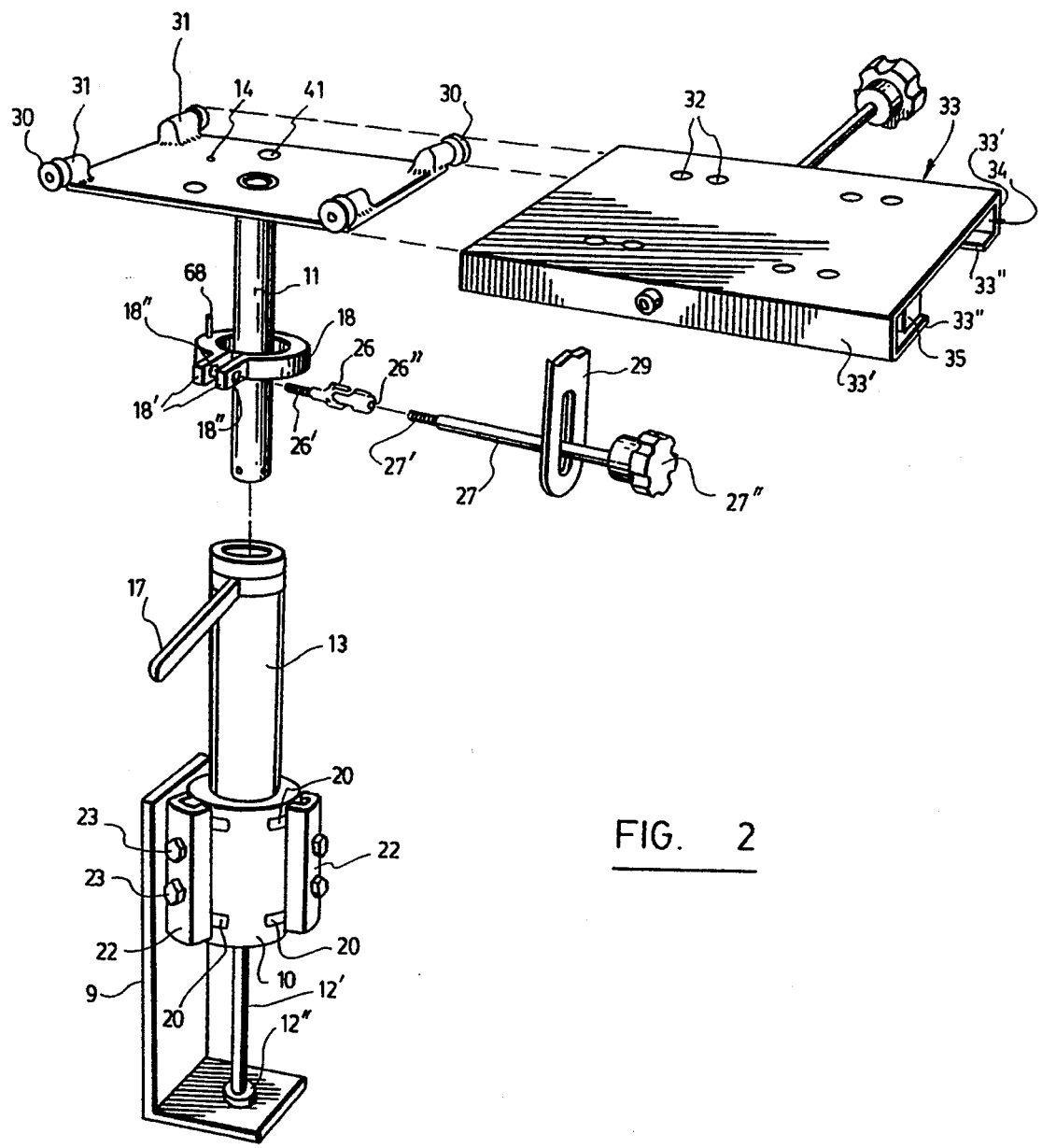
FIG. 2 is an exploded perspective view of the base, also Showing the chair carriage, further showing two operating handles.
Figure 3:
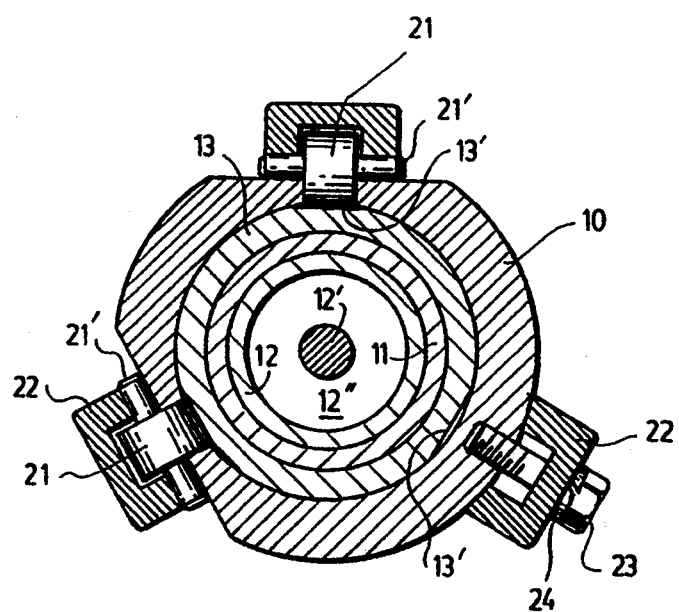
FIG. 3 is a schematic cross-sectional top plan view of the height adjustable base, also showing the guide means and the integral adjustment means.
Figure 4:
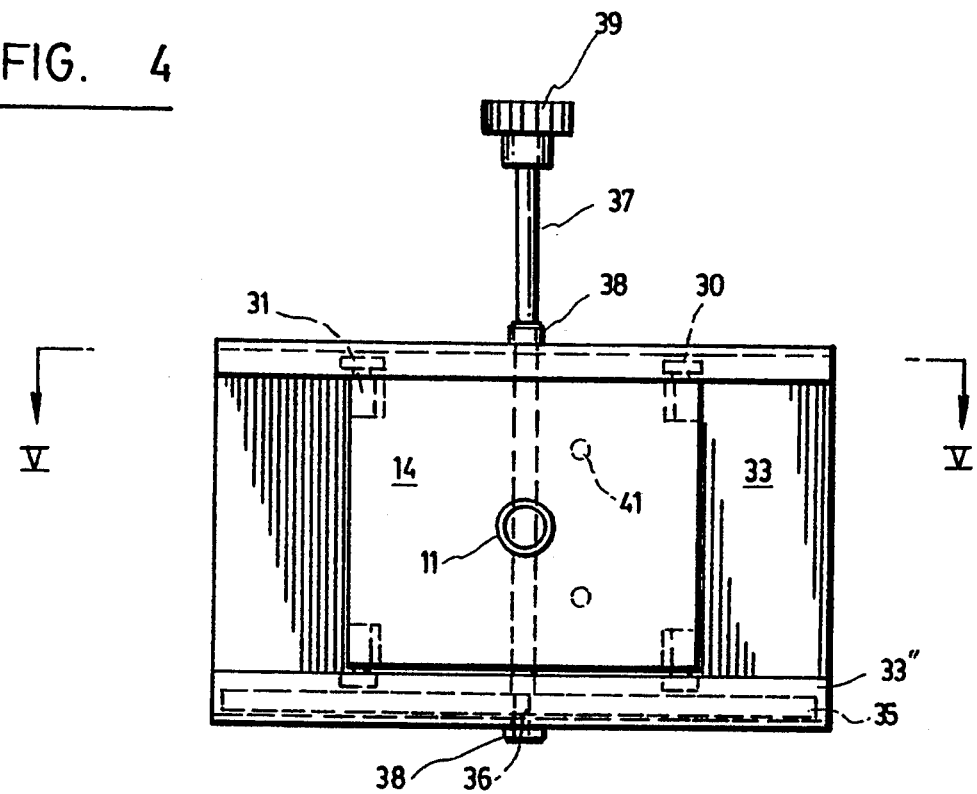
FIG. 4 is a bottom plan view of the chair carriage and slide plate in center position, also showing the operating handle.

A first essential feature of the invention lies in the structure and operation of the height adjustable base 6, which is depicted in FIGS. 1, 2 and 3. The base 6 comprises an upright rigid L-shaped bracket 9 secured to the assembly 7 by a plate 9' and bolts 9" as is shown in FIG. 6. Mounted on the bracket 9 at the upper portion thereof is a large diameter cylindrical member 10. This member 10 is adapted to receive the following elements: a small diameter cylindrical member 11; a power cylinder 12 fitted into the member 11; and another cylindrical member 13 of intermediate diameter in which the cylindrical member 11 of small diameter is fitted. The cylindrical member 13 is sized to fit into the cylindrical member 10 and to be held in a sliding yet non-rotatable manner within the same by guide means, as will be disclosed hereinafter. The power cylinder 12 is preferably an air cylinder although, in some cases, it can be a hydraulic cylinder. This cylinder has a downwardly projecting piston rod 12'. The lower end of this rod 12' is firmly anchored in the horizontal portion of bracket 9 by means of a clamp 12".

The upper end of the cylindrical member 11 of small diameter is welded or otherwise secured to the bottom surface of a slide plate 14, from which it extends vertically, downwardly. The power cylinder 12 extends in the member 11 in a precise fit, as seen in FIGS. 1 and 3 and bears at each upper end against the slide plate 14. Means to operate the cylinder 12 from the chair assembly 1 are provided, consisting of a lever 17 connected to the actuating mechanism of the power cylinder at the upper end of the latter. The cylindrical member 11 of small diameter is free to rotate relative to the power cylinder 12 contained therein and the cylindrical member 13 of intermediate diameter in which it is precisely fitted. In order to retain the cylindrical member 13 from slipping downwardly of its own weight relative to the member 11 contained therein, a retaining ring 19 is provided. The ring 19 has three circumferentially-spaced set screws 19' which engage corresponding holes provided at the lower end of cylindrical member 11 (see FIG. 1). This ring 19 causes the cylindrical member 13 to move bodily with the member 11 and the cylinder 12 contained therein when the cylinder is actuated, the whole sliding axially from a lower position as seen in FIG. 7 to an uppermost position as shown in FIG. 2.

Lock means are provided to lock the slide plate 14 and the chair assembly attached to it, to the cylindrical member 13 of intermediate diameter. These means consists of a collar 18 attached by means of one screw 68 to the bottom of the side plate 14, coaxially relative to the members 11 and 13. The collar 18 which is sized to receive the upper end of the member 11 of intermediate diameter has a pair of parallel ears 18' which are each formed with a threaded hole 18" in alignment with each other. Holes 18" are adapted to be threadedly engaged by a short threaded portion 26' projecting from a universal-joint member 26. The opposite end of the member 26 has a threaded bore 26". This bore receives the threaded end 27' of a shaft 27 to which is secured a knob 27". Turning the knob 27" in one direction will tighten the collar 18 around the upper end of the member 11, while turning it in the opposite direction will loosen the collar, thereby allowing the slide plate 14 and the cylindrical member 13 of smaller diameter connected to it to turn relative to the member 13 of intermediate diameter and thus relative to the vertical axis of the base 6. Preferably, the shaft 27 is disposed laterally under seat 2 towards the side wall 28 of the driver's cabin. The shaft 27 passes under the lever 17 and through a slotted tab 29 depending from the right side of seat 2 as best shown in FIG. 6. Lifting of the shaft 27 within the slot of the tab 29 causes lifting of the lever 17 and thus actuation of the air cylinder 12.

As described hereinabove, guide means are provided to slidably hold the cylindrical member 13 within the member 10 while preventing it from rotating relative to the bracket 9.

As shown in FIG. 2 and 3, the guide means comprises, at each end of member 10, three circumferentially-spaced tangential slots 20 having a central rectangular recess which communicates with the inner surface of the member 10. Each of these slots 20 receives a pair of roller bearings 21 that are mounted on a same shaft 21' and have their rolling surfaces bearing against flattened surfaces 13' provided for this purpose on the exterior surface of the cylindrical member 13. The roller bearings 21 are kept in position by three vertically oriented bars 22. Both ends of bars 22 are formed with grooves shaped to give room to the roller bearing 21 and hold the extremities of their shaft 21'. The bars 22 are held by bolts 23 and Belleville washers 24 screwed into the cylindrical member 10.

The above construction is very efficient in use and eliminates all the wobbling and shaking encountered so far with other constructions. In this connection, it may be appreciated that the guide means does not only serve as a guide for the cylindrical member 13. As a matter of fact, it also serves as an adjustment means should the various elements begin to wobble or shake. A maintenance person needs only tighten the bolts 23 until the cylindrical member 11 and roller bearings 21 are once again in close contact.

Figure 5:
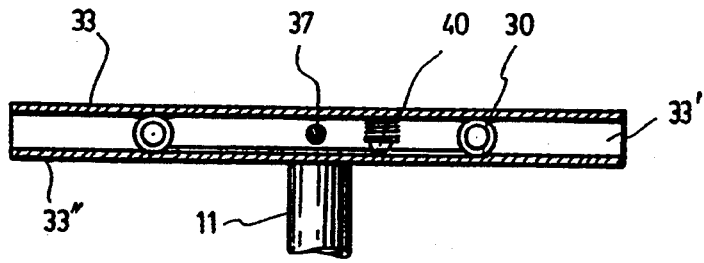
FIG. 5 is an side elevation view of the assembly shown in FIG. 4.

Another major feature of the invention lies in the way the seat 2 is mounted onto the slide plate 14 attached to the upper end of the cylindrical member 11. FIG. 2 shows the four corners of the slide plate 14 provided with rollers 30 mounted in the fore-aft direction in bushings 31. The seat 2 is mounted by means of bolts (not shown) onto a seat carriage 33 including a rectangular plate provided with holes 32 for receiving the seat mounting bolts. This plate has integral lateral walls 33' and inwardly extending flanges 33" defining a pair of opposite lateral channels 34. The rollers 30 are adapted to roll within the channels 34. Thus, the carriage 33 can slide from side to side in a side aft direction. Releasable lock means are provided to position the carriage 33 and the chair connected thereto relative to the slide plate 14. These lock means comprises an elongated bar 35 located in one of the channels 34 and having a central threaded hole 36 transversal to the carriage. A long shaft 37 is journaled in bushings 38 fixedly secured to each side wall 33' and has an endmost threaded portion engaged in the hole 36. A knob 39 easily actuable from the chair is provided to rotate the shaft 37. It will be clear that turning the shaft 37 in one direction will bring the bar 35 into locking contact with rollers 30, thus immobilizing the carriage 33. Turning the knob 39 in the opposite direction releases the carriage. One may also understand that the shaft 37 that extends across the slide plate 14 above the same, acts as a locking means and prevents this plate 14 from moving out of the carriage 33. Indeed, it extends across the path of the rollers 30, as is shown in FIG. 5.

Means to center the carriage 33 are further provided, consisting of a spring-loaded ball 40 secured to the underside of carriage 33 and which snaps into a perforation 41 in slide plate 14.

In the embodiment shown and described hereinabove, the chair has been shown mounted onto the chair carriage 33 so as to move therewith in a side-aft direction. It is worth mentioning however that the chair could also be mounted onto the chair carriage 33 so as to move therewith in the fore-aft direction. For this purpose, one has only to attach the seat carriage 33 onto the bottom of the seat after having oriented the same in a direction that is perpendicularly to the one shown in the accompanying drawings. Switching of the seat motion from the side-aft to the fore-aft direction can be made easily, thanks to attachment bolts insertable into the holes 32 (see FIG. 2), which are easily accessible from the bottom of the chair. This of course adds to the versatility of the chair assembly according to the invention.

A third feature contemplated by the invention lies in the structure of the backrest and footrest that are both adjustable.

As it better shown in FIG. 7, the backrest 3 is attached to a frame 42 having a pair of support struts 43 transversely pivotable at 44 behind the seat 2. The lower end of one of the struts 43 has an outwardly projecting pin 45 that extends through a slot 47 formed in a flange 48 secured to the chair carriage 33 on the left side of the chair. The free end of the pin 45 is threadedly engaged in a tightenable knob 46. The end of the left strut 43 has attached thereto a tension spring 49 that is secured to the front of the frame 2' of the seat 2. As clearly shown in FIG. 7, the backrest may thereby be pivoted from an upright vertical position to an inclined position of approximately 115 degrees by unscrewing the bolt 46 and pushing on the backrest. The backrest may of course be set in any position between these two limits by screwing again the bolt 46, holding of the backrest to the vertical position being "automatically" achieved thanks to the spring 49 which permanently urges the backrest back to this vertical position.

As is shown in FIGS. 6 and 7, the chair assembly 1 may also be provided with an adjustable footrest 5 including a foot support 51 secured to the upper ends of a pair of parallel support arms 57 pivotally mounted at 56 to the base 6. The foot support 51 has a depressible button 52 that upwardly projects therefrom substantially in its center. The latter is connected to a switch device 53, which in turn actuates the piston of another power cylinder 54, which is preferably an air cylinder although use could also be made of a hydraulic cylinder under certain circumstances. The end of the piston rod 54' of the cylinder 54 is pivotically attached to the foot support 51. The other end of the air cylinder 54 is pivotally attached to a pair of pivot lugs 55 mounted onto the base below the attachment points 56 of the support arms 57. As can be appreciated the driver only has to press on the button 52 with his or her feet to raise and lower the footrest according to his or her leg length.

Preferably also, each armrest 4 is mounted on a telescopic rod 58 that is vertically adjustable relative to support rods 59 integral to the frame of the seat 2 (see FIG. 1). Fixation of the rods 58 relative to the rods 59 can be achieved with one or more bolts 61 insertable into holes provided for this purpose in the rods. This makes it possible for the driver to easily adjust the armrests 4 to any desired height. Moreover, each armrest is preferably connected by a pivot 50 to the corresponding rod 58 so as to be upwardly pivotable about this pivot 50 to make easier the access to the seat 2.

We claim:

1. A chair assembly for use in a vehicle, said assembly comprising:

a chair having a seat and a backrest; and a chair supporting height-adjustable base including mounting means to provide rotation, smooth raising and smooth lowering of said chair whenever desired and effective immobility of said chair in any given position, whereby said chair is wobble and vibration free at all times, wherein said mounting means comprises:

a support bracket adapted to be secured to said vehicle;

an uppermost plate on which said chair is mounted;

a first cylindrical member secured to the center of said plate and extending downwardly therefrom;

a power cylinder sized to fit precisely into said first cylindrical member, said power cylinder having a lower end bearing onto a horizontal portion of the support bracket, and an upper end bearing onto said uppermost plate;

means to operate said power cylinder from the chair to raise and lower said chair;

a second cylindrical member into which said first cylindrical member precisely fits in a rotatable manner;

means to retain the second cylindrical member from slipping downwardly relative to the first cylindrical member;

a third cylindrical member attached to an upper portion of said bracket and in which said second cylindrical member is held in a sliding yet non-rotatable manner; and means to releasably lock the uppermost plate to said non-rotatably held second cylindrical member to prevent rotation of the chair relative to the base whenever desired.

2. The assembly of claim 1, wherein said third cylindrical member is provided with guide means for facilitating raising and lowering of said chair.

3. The assembly of claim 2, wherein said guide means comprises:

three equally circumferentially spaced tangential slots formed in said third cylindrical member close to each end thereof;

roller bearings mounted in each slot and contacting a corresponding flattened outer surface portion of said second cylindrical member, such a contact preventing the second cylindrical member from rotating relative to said third cylindrical member; and means to adjustably secure said roller bearings in said slots.

4. The assembly of claim 3, wherein said means to adjustably secure said roller bearings comprises:

a rigid bar overlying each of said bearings at the upper and lower ends of said third cylindrical member; and a pair of bolts for bolting each said bar to said third cylindrical member, whereby tightening said bolts eliminates wobble and vibration due to wear.

5. The assembly of claim 4, wherein said means to retain the second cylindrical member from slipping downwardly comprises:

a retaining ring attachable to the lower end of said first cylindrical member and abutting the lower end of said second cylindrical member.

6. The assembly of claim 5, wherein said chair is attached to a chair carriage which is itself slidably mounted onto said uppermost plate.

7. The assembly of claim 6, wherein:

said chair carriage comprises a pair of laterally extending channels;

said uppermost plate has rollers mounted thereon for lateral rotation, said rollers being adapted to roll in said channels of said carriage; and lock means are provided to releasably lock said carriage relative to said uppermost plate in any desired position.

8. The assembly of claim 7, wherein said lock means comprises:

an elongated bar disposed in one of said channels close to the rollers rolling in said one channel, said elongated bar having a central threaded hole; and a long shaft journaled in said carriage in a transversal direction, said shaft having a threaded portion at one end thereof, that engages said threaded hole, whereby rotating the shaft in one direction locks said elongated bar against said rollers to lock said carriage to said uppermost plate.

9. The assembly of claim 8, further comprising centering means to keep the chair centered relative to the base, said centering means comprising:

a hole provided in said uppermost plate; and a spring loaded ball secured to the undersurface of said carriage, said ball being adapted to engage said hole, said ball and said hole being so located as to center said carriage relative to said base.

10. The assembly of claim 9, wherein the backrest of the chair is supported by a frame pivotally connected to the seat about a transversal pivot axis, and wherein:

one side of said frame has a lower end projecting downwardly from said pivot axis;

a tension spring is secured to said lower end of said frame and to a front portion of said seat; and adjusting means are provided to adjustably incline the backrest, said adjusting means being biased by said tension spring.

11. The assembly of claim 10, wherein said backrest adjusting means comprises;

a flange supported at one side of said chair;

a curved slot provided in said flange;

a pin fixed to the lower portion of said frame and extending through the slot; and a knob threaded to said pin and tightenable against said flange at any selectable position in said slot.

12. The assembly of claim 11, further comprising a footrest.

13. The assembly of claim 12, wherein said footrest comprises a foot support that is vertically adjustable by way of an adjustment means comprising:

a pair of arms having lower ends pivotally attached to said support bracket and upper ends attached to the foot support; and a second power cylinder having one end pivotally secured to said bracket and another end secured to said foot support, said second power cylinder being actuable by a button located in the foot support and connected to a switch means, whereby one can raise or lower said footrest by depressing said button with a foot and by pushing against the said footrest, respectively.

14. The assembly of claim 12, wherein said chair is provided with a pair of armrest that are adjustable in height and pivotable to a vertical position.

15. The assembly of claim 12, wherein said vehicle is a locomotive.

16. A chair assembly for use in a vehicle, said assembly comprising:

a chair having a seat and a backrest;

a chair supporting height-adjustable base including mounting means to provide rotation, smooth raising and smooth lowering of said chair whenever desired and effective immobility of said chair in any given position whereby said chair is wobble and vibration free at all times;

a foot rest comprising a foot support, said footrest being vertically adjustable by way of an adjustment means comprising:

a pair of arms having lower ends pivotally attached to a support bracket adapted to be secured to said vehicle, and upper ends attached to the foot support; and a power cylinder having one end pivotally secured to said support bracket and another end secured to said foot support, said power cylinder being actuable by a button located in the foot support and connected to a switch means, whereby one can raise or lower said footrest by depressing said button with a foot and by pushing against the said footrest, respectively.

17. A chair assembly for use in a vehicle, said assembly comprising:

a chair having a seat and a backrest;

a chair supporting height-adjustable base including mounting means to provide rotation, smooth raising and smooth lowering of said chair whenever desired and effective immobility of said chair in any given position, whereby said chair is wobble and vibration free at all times;

a slide plate that is part of said mounting means, said slide plate having rollers mounted thereon for lateral rotation;

a chair carriage to which is attached said chair, said carriage being slidably mounted onto said slide plate and comprising a pair of laterally extending channels in which the rollers of the carriage are adapted to roll; and lock means to releasably lock said carriage relative to said slide plate in any desired position, said lock means comprising:

an elongated bar disposed in one of said channels close to the rollers rolling in said one channel, said elongated bar having a central threaded hole; and a long shaft journaled in said carriage in a transversal direction, said shaft having a threaded portion at one end thereof, that engages said threaded hole, whereby rotating the shaft in one direction locks said elongated bar against said rollers to lock said carriage to said slide plate.

18. The assembly of claim 17, further comprising means to keep the chair centered relative to the base, said means comprising:

a hole provided in said slide plate; and a spring loaded ball secured to the undersurface of said carriage, said ball being adapted to engage said hole, said ball and said hole being so located as to center said carriage relative to said base.

19. The assembly of claim 18, wherein said vehicle is a locomotive.

20. The assembly of claim 18, wherein the backrest of the chair is supported by a frame pivotally connected to the seat about a transversal pivot axis, and wherein:

one side of said frame has a lower end projecting downwardly from said pivot axis;

a tension spring is secured to said lower end and to a front portion of said seat; and adjusting means are provided to adjustably incline the backrest, said adjusting means being biased by said tension spring.

21. The assembly of claim 20, wherein said chair is provided with a pair of armrest adjustable in height and pivotable to a vertical position.

22. The assembly of claim 20, wherein said backrest adjusting means comprises;

a flange supported at one side of said chair;

a curved slot provided in said flange;

a pin fixed to the lower portion of said frame and extending through the slot; and a knob threaded to said pin and tightenable against said flange at any selectable position in said slot.

23. The assembly of claim 22, further comprising a footrest including a foot support, said foot support being vertically adjustable by way of an adjustment means, said adjustment means comprises:

a pair of arms having lower ends pivotally attached to a support bracket adapted to be secured to said vehicle, and upper ends attached to the foot support; and a power cylinder having one end pivotally secured to said support bracket and another end secured to said foot support, said power cylinder being actuable by a button located in the foot support and connected to a switch means;

whereby one can raise or lower said footrest by depressing said button with a foot and by pushing against the said footrest, respectively.

* * * * *